(12) United States Patent
Noguchi et al.

(10) Patent No.: US 12,220,772 B2
(45) Date of Patent: Feb. 11, 2025

(54) ARC WELDING CONTROL METHOD AND ARC WELDING DEVICE

(71) Applicant: Panasonic Intellectual Property Management Co., Ltd., Osaka (JP)

(72) Inventors: Takahiro Noguchi, Osaka (JP); Masaru Kowa, Osaka (JP); Haruki Egawa, Osaka (JP); Akira Nakagawa, Osaka (JP); Junji Fujiwara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 699 days.

(21) Appl. No.: 17/505,098

(22) Filed: Oct. 19, 2021

(65) Prior Publication Data

US 2022/0063009 A1 Mar. 3, 2022

Related U.S. Application Data

(63) Continuation of application No. PCT/JP2020/017179, filed on Apr. 21, 2020.

(30) Foreign Application Priority Data

Apr. 22, 2019 (JP) .................................. 2019-081177

(51) Int. Cl.
*B23K 9/09* (2006.01)
*B23K 9/073* (2006.01)
(Continued)

(52) U.S. Cl.
CPC ............ *B23K 9/091* (2013.01); *B23K 9/0732* (2013.01); *B23K 9/0956* (2013.01);
(Continued)

(58) Field of Classification Search
CPC ...... B23K 9/091; B23K 9/164; B23K 9/0732; B23K 9/092; B23K 9/0956; B23K 9/1012;
(Continued)

(56) References Cited

U.S. PATENT DOCUMENTS

| 6,087,626 A | 7/2000 | Hutchison et al. |
| 6,326,591 B1 | 12/2001 | Hutchison et al. |

(Continued)

FOREIGN PATENT DOCUMENTS

| JP | 59-199174 | 11/1984 |
| JP | 11-267835 | 10/1999 |

(Continued)

OTHER PUBLICATIONS

International Search Report issued Jul. 28, 2020 in International (PCT) Application No. PCT/JP2020/017179 with English translation.

(Continued)

*Primary Examiner* — Brian W Jennison
(74) *Attorney, Agent, or Firm* — Wenderoth, Lind & Ponack, L.L.P.

(57) ABSTRACT

Disclosed is an arc welding control method of controlling a welding current in short-circuit arc welding of feeding a welding wire toward a base metal and alternating a short-circuit state and an arc state. The arc welding control method includes: executing, in the short-circuit state, a first increase in the welding current with a first slope, a first decrease in the welding current to a first bottom value after executing the first increase, a second increase in the welding current with a second slope after executing the first decrease, and a second decrease in the welding current to a second bottom value that is smaller than the first bottom value after executing the second increase to shift a state to the arc state.

8 Claims, 4 Drawing Sheets

(51) Int. Cl.
  *B23K 9/095* (2006.01)
  *B23K 9/10* (2006.01)
  *B23K 9/133* (2006.01)
  *B23K 9/16* (2006.01)
  *B23K 35/38* (2006.01)

(52) U.S. Cl.
  CPC ............ *B23K 9/1012* (2013.01); *B23K 9/133* (2013.01); *B23K 9/16* (2013.01); *B23K 35/38* (2013.01)

(58) Field of Classification Search
  CPC ........ B23K 9/1043; B23K 9/16; B23K 9/173; B23K 2103/04
  See application file for complete search history.

(56) References Cited

U.S. PATENT DOCUMENTS

| | | |
|---|---|---|
| 6,653,595 B2 | 11/2003 | Hutchison et al. |
| 6,800,832 B2 | 10/2004 | Hutchison et al. |
| 6,987,243 B2 | 1/2006 | Hutchison et al. |
| 7,598,474 B2 | 10/2009 | Hutchison et al. |
| 7,928,340 B2 | 4/2011 | Aimi et al. |
| 8,604,387 B2 | 12/2013 | Aimi et al. |
| 2002/0079302 A1 | 6/2002 | Hutchison et al. |
| 2003/0085210 A1* | 5/2003 | Hutchison ............ B23K 9/1093 219/130.21 |
| 2004/0238513 A1 | 12/2004 | Hutchison et al. |
| 2006/0138115 A1* | 6/2006 | Norrish .................. B23K 9/091 219/137.71 |
| 2006/0163229 A1 | 7/2006 | Hutchison et al. |
| 2008/0006616 A1 | 1/2008 | Hutchison et al. |
| 2009/0127242 A1 | 5/2009 | Aimi et al. |
| 2010/0006552 A1 | 1/2010 | Hutchison et al. |
| 2010/0224608 A1 | 9/2010 | Aimi et al. |

FOREIGN PATENT DOCUMENTS

| | | |
|---|---|---|
| JP | 4760053 | 8/2011 |
| WO | 2017/029783 | 2/2017 |

OTHER PUBLICATIONS

Extended European Search Report issued May 16, 2022 in corresponding European Patent Application No. 20795977.6.

* cited by examiner

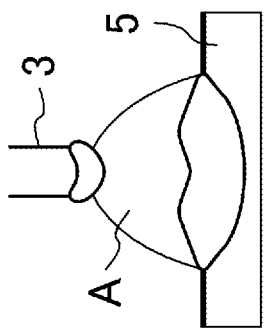
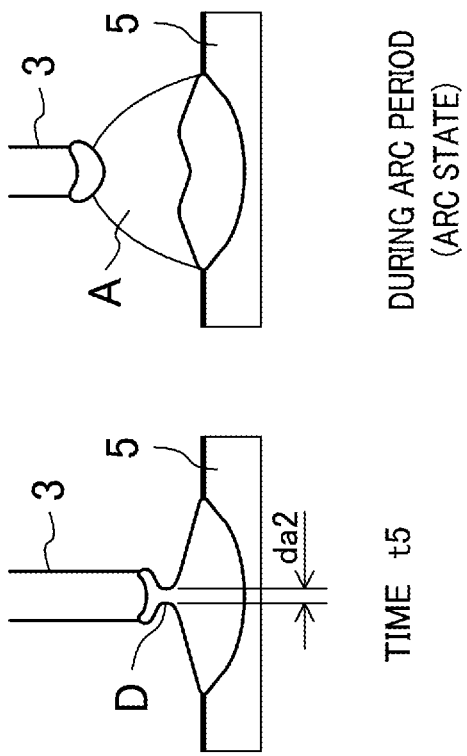
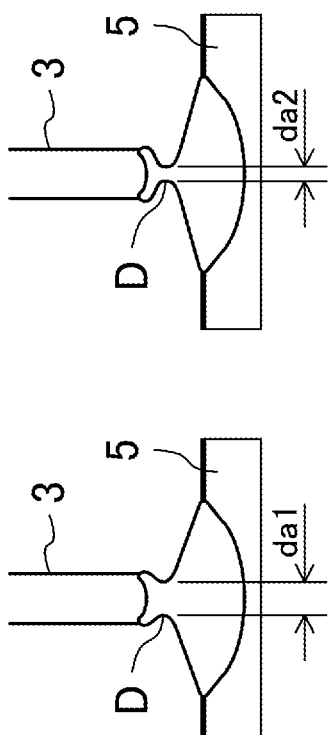
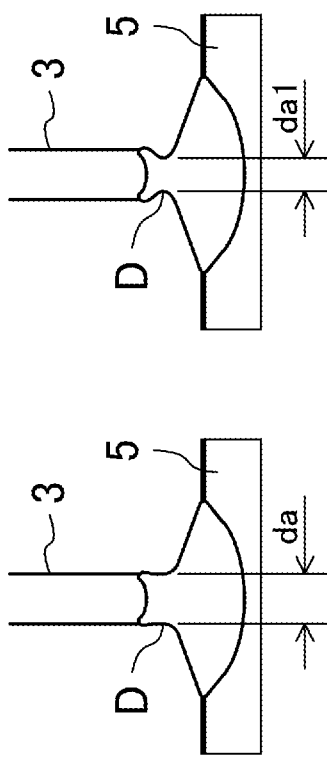

ARC WELDING CONTROL METHOD AND ARC WELDING DEVICE

CROSS-REFERENCE TO RELATED APPLICATIONS

This is a continuation of International Application No. PCT/JP2020/017179 filed on Apr. 21, 2020, which claims priority to Japanese Patent Application No. 2019-081177 filed on Apr. 22, 2019. The entire disclosures of these applications are incorporated by reference herein.

BACKGROUND

The present disclosure relates to as an arc welding control method and an arc welding device that control welding currents in short-circuit arc welding.

Japanese Patent No. 4760053 discloses an arc welding device that controls a welding current in short-circuit arc welding of alternating a short-circuit state and an arc state. This arc welding device executes, in the short-circuit state: an increase in a welding current with a predetermined slope; and a decrease in the welding current in response to detection of a constriction phenomenon of a molten metal droplet after executing the increase. The executed decrease reduces the arc force generated at the time of releasing the short circuit, and the occurrence of spatter.

SUMMARY

In Japanese Patent No. 4760053 described above, however, if there is a large amount of a welding current at the start of the decrease, the welding current at the time of opening the short-circuit is less reduced by executing the decrease, which may hinder effective reduction in the occurrence of spatter.

The present disclosure was made in view of the problem. It is an object of the present disclosure to reduce the occurrence of spatter more reliably and effectively.

According to an aspect of the present disclosure, an arc welding control method controls a welding current in short-circuit arc welding of feeding a welding wire toward a base metal and alternating a short-circuit state and an arc state. The arc welding control method includes: executing, in the short-circuit state, a first increase in the welding current with a first slope, a first decrease in the welding current after executing the first increase, a second increase in the welding current with a second slope after executing the first decrease, and a second decrease in the welding current after executing the second increase.

From this aspect, there is a smaller amount of the welding current at the start of the second decrease than in the case without any first decrease. The amount of the welding current at the time of opening the short circuit by executing the second decrease is reduced more. Accordingly, the occurrence of spatter is reduced more reliably and effectively.

The present disclosure reduces the occurrence of spatter more reliably and effectively.

BRIEF DESCRIPTION OF THE DRAWINGS

FIG. 3(a) is a schematic front view showing the vicinity of the tip of a welding wire at the start (t2) of a first increase in the welding current with a first slope. FIG. 3(b) corresponds to FIG. 3(a) and shows the state at the end (t3) of the first increase. FIG. 3(c) corresponds to FIG. 3(a) and shows the state at the start (t5) of a second decrease in the welding current to a second bottom value. FIG. 3(d) corresponds to FIG. 3(a) and shows an arc state (i.e., during an arc period).

DETAILED DESCRIPTION

Now, embodiments of the present disclosure will be described with reference to the drawings. The following description of advantageous embodiments is a mere example in nature, and is not at all intended to limit the scope, applications, or use of the present invention.

First Embodiment

Figure 1:
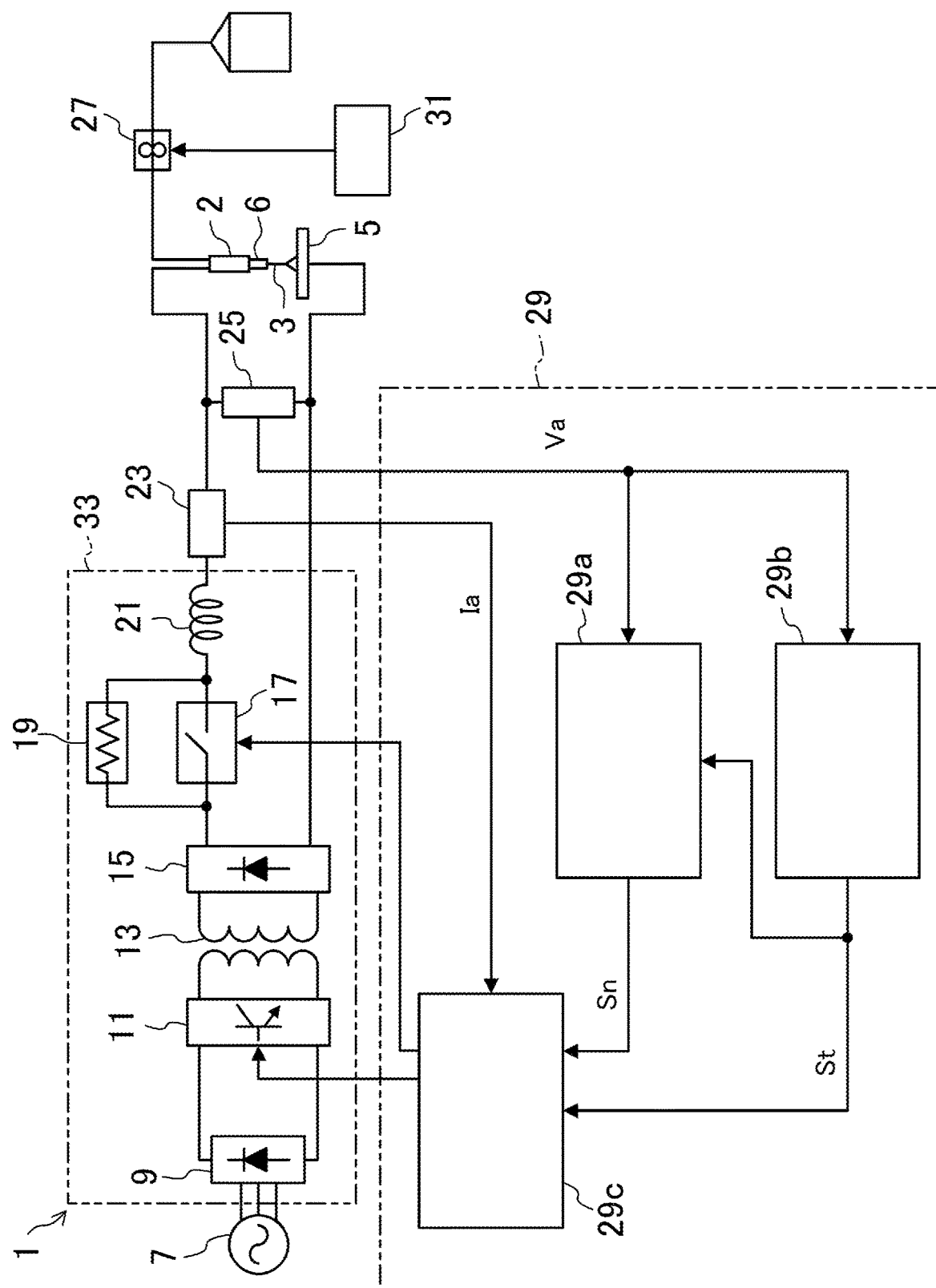
FIG. 1 shows a schematic configuration of an arc welding device according to an embodiment of the present disclosure.

FIG. 1 shows an arc welding device 1 according to a first embodiment of the present disclosure. The arc welding device 1 performs short-circuit arc welding of feeding a welding wire 3 held by a torch 2, toward a base metal 5 at a constant feed velocity and alternating a short-circuit state and an arc state. In the short-circuit state, the welding wire 3 and the base metal 5 are short-circuited. In the arc state, arc A (see FIG. 3(d)) occurs between the welding wire 3 and the base metal 5. The torch 2 is held by an operator. The welding wire 3 is made of mild steel or stainless steel (SUS). The welding wire 3 has a wire radius set within a range from 0.8 mm to 1.4 mm and preferably to 1.2 mm. Used as the base metal 5 is a thin plate (i.e., a plate member) made of mild steel. The base metal 5 has a plate thickness set within a range from 1.6 mm to 4.5 mm, for example, 2.3 mm. Used as the shield gas to be blown to the base metal 5 is carbon dioxide gas. The torch 2 has a tip 6 for supplying electric power to the welding wire 3.

The arc welding device 1 includes an alternating current (AC) power supply 7, a first rectifier element 9, a first switching element 11, a main transformer 13, a second rectifier element 15, a second switching element 17, a resistor 19, a reactor 21, a current detector 23, a voltage detector 25, a wire feeding unit 27, a welding output control unit 29, and a wire feed velocity control unit 31. The first rectifier element 9, the first switching element 11, the main transformer 13, the second rectifier element 15, the second switching element 17, the resistor 19, and the reactor 21 constitute a current supply unit 33 that supplies welding currents between the welding wire 3 and the base metal 5.

The first rectifier element 9 rectifies the outputs from the AC power supply 7.

The first switching element 11 adjusts the outputs from the first rectifier element 9 to outputs suitable for welding under the control of the welding output control unit 29.

The main transformer 13 converts the outputs from the first switching element 11 into outputs suitable for welding.

The second rectifier element 15 rectifies the outputs from the main transformer 13.

The second switching element 17 adjusts the outputs from the second rectifier element 15 to outputs suitable for welding under the control of the welding output control unit 29.

The resistor 19 is connected in parallel to the second switching element 17.

The reactor 21 is connected in series with the second switching element 17 and rectifies the outputs from the second switching element 17 to stabilize the welding currents.

The current detector 23 detects the welding currents supplied between the welding wire 3 and the base metal 5.

The voltage detector 25 detects the welding voltages supplied between the welding wire 3 and the base metal 5.

The wire feeding unit 27 feeds the welding wire 3 at a feed velocity based on the outputs from the wire feed velocity control unit 31.

The welding output control unit 29 includes a constriction phenomenon detection unit 29a, a state determination unit 29b, and a welding current control unit 29c.

The constriction phenomenon detection unit 29a compares the change amount dVa/dt of a welding voltage Va detected by the voltage detector 25 per unit time to a preset threshold change amount. If the change amount dVa/dt of the welding voltage Va per unit time is larger than the threshold change amount, the constriction phenomenon detection unit 29a outputs a constriction determination signal Sn indicating a detection of the constriction phenomenon of a molten metal droplet D (see FIGS. 3(a) to 3(c)). If the change amount dVa/dt is smaller than or equal to the threshold change amount, the constriction phenomenon detection unit 29a outputs a constriction determination signal Sn indicating no detection of any constriction phenomenon of the molten metal droplet D. In the constriction phenomenon, the molten metal droplet D constricts. As shown in FIG. 3(c), at the time of detecting the constriction phenomenon, the constriction radius (the radius of the constricting section) is da2. The constriction phenomenon is detected at a time t5 (see FIG. 2) which will be described later.

The state determination unit 29b compares the welding voltage Va detected by the voltage detector 25 to a preset threshold voltage Vth. If the welding voltage Va is lower than or equal to the threshold voltage Vth, the state determination unit 29b outputs a state signal St indicating that the state is in the short-circuit state. On the other hand, if the welding voltage Va is higher than the threshold voltage Vth, the state determination unit 29b outputs a state signal St indicating that the state is in the arc state.

The welding current control unit 29c controls a welding current Ia based on the welding current Ia detected by the current detector 23, the constriction determination signal Sn output by the constriction phenomenon detection unit 29a, and the state signal St output by the state determination unit 29b. The set current (the average of the welding currents Ia in each constant section) ranges from to 100 A to 250 A.

Figure 2:
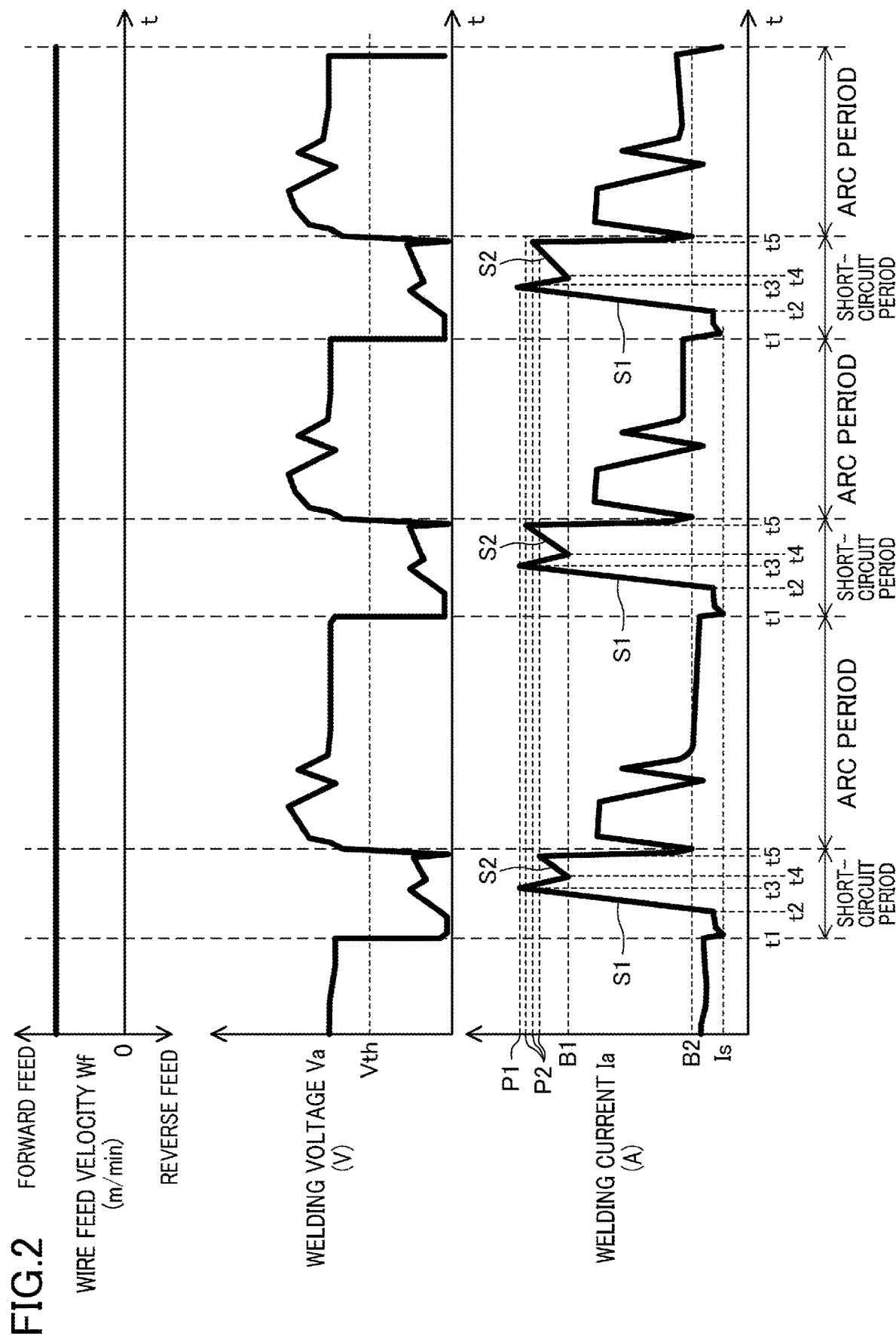
FIG. 2 shows output waveforms of a welding current, a welding voltage, and a wire feed velocity in arc welding.

As shown in FIG. 2, the wire feed velocity control unit 31 outputs signals indicating a constant wire feed velocity Wf.

Now, the control of the welding current Ia by the welding current control unit 29c will be described in detail. In FIG. 2, each period of the short-circuit state is referred to as a "short-circuit period", and each period of the arc state as an "arc period."

As shown in FIG. 2, at a time t1, once the state determination unit 29b outputs the state signal St indicating the short-circuit state, the welding current control unit 29c turns off the second switching element 17 to reduce the welding current Ia to an initial current Is.

After that, the welding current control unit 29c turns on the second switching element 17 and controls the first switching element 11 so that the welding current Ia starts increasing from the initial current Is at the time t1 and increases with a first slope S1 between times t2 to t3. The first slope S1 is set in advance in accordance with the wire feed velocity Wf, for example, to 400 A/ms. Between the times t2 to t3, the molten metal droplet D at the tip of the welding wire 3 shifts from the non-constricting state shown in FIG. 3(a) to the slightly constricting state shown in FIG. 3(b). In FIG. 3(a), da corresponds to the wire radius of the welding wire 3 when there is no constriction in the molten metal droplet D, that is, when the molten metal droplet D does not constrict. In FIG. 3(b), da1 indicates the constriction radius at the occurrence of constriction in the molten metal droplet D at the tip of the welding wire 3. At the time t3, the change amount dVa/dt of the welding voltage Va detected by the voltage detector 25 per unit time does not exceed the threshold change amount. As shown in FIG. 3(b), the molten metal droplet D constricts slightly.

At the time t3, in accordance with an increase in the welding current Ia to a first peak value P1 set in advance, the welding current control unit 29c turns off the second switching element 17 to reduce the welding current Ia. Here, the welding current control unit 29c performs the control of turning off the second switching element 17, once the welding current Ia reaches the first peak value P1. Alternatively, the control may be performed in response to (after) the lapse of a preset time from a predetermined reference time. Here, the predetermined reference time may be, for example, a start time of the short-circuit arc welding or the time t1 or t2. The first peak value P1 is preset within a range from 250 A to 450 A in accordance with the wire feed velocity Wf.

Next, at a time t4, once the welding current Ia reaches a preset first bottom value B1, the welding current control unit 29c turns on the second switching element 17 and controls the first switching element 11 to increase the welding current Ia with a second slope S2 from the first bottom value B1. Here, the welding current control unit 29c performs the control of increasing the welding current Ia with the second slope S2 from the first bottom value B1, once the welding current Ia reaches the first bottom value B1. Alternatively, the control may be performed in response to (after) the lapse of a preset time from a predetermined reference time. Here, the predetermined reference time may be a start time of the short-circuit arc welding or any of the times t1 to t3. The first bottom value B1 is set within a range from 200 A to 350 A, and the second slope S2 from 20 A/ms to 70 A/ms.

Here, the first bottom value B1 is set to 200 A or more for the following reason. At a first bottom value B1 smaller than 200 A, insufficient heat is input to the fed welding wire 3 to reduce the melting speed of the welding wire 3 and cause the welding wire 3 to plunge into the base metal 5 and bend, which may increase the period from the time t4 to the opening of the short-circuit too much.

The first bottom value B1 is set to 350 A or less for the following reason. A first bottom value B1 greater than 350 A fails to sufficiently reduce the welding current Ia at the time of opening the short-circuit and to relatively reduce the spatter.

Next, at the time t5, as shown in FIG. 3(c), the molten metal droplet D at the tip of the welding wire 3 constricts more than at the time t3. Once the constriction phenomenon detection unit 29a outputs then a constriction determination signal Sn indicating the detection of the constriction phenomenon, the welding current control unit 29c turns off the second switching element 17. In FIG. 3(c), da2 denotes the constriction radius at the occurrence of the constriction in the molten metal droplet D at the tip of the welding wire 3 at the time t5. Here, the values of da, da1, and da2 satisfy the relationship da>da1>da2. As a result, the welding current Ia decreases to a second bottom value B2 that is smaller than the first bottom value B1. As shown in FIG. 3(d), the opening of the short-circuit shifts the state to the arc state. The second bottom value B2 ranges from 50 A to 150 A. The welding current Ia at the time t5, that is, at the time of detecting the constriction phenomenon reaches a second peak value P2 that is smaller than the first peak value P1.

As described above, in the first embodiment, the welding current control unit 29c executes, in the short-circuit state, the first increase in the welding current Ia with the first slope S1, the first decrease in the welding current Ia to the first bottom value B1 after executing the first increase, the second increase in the welding current Ia with the second slope S2 after executing the first decrease, and the second decrease in the welding current Ia to the second bottom value B2 that is smaller than the first bottom value B1 after executing the second increase to shift the state to the arc state.

According to the first embodiment, the first decrease in the welding current Ia is executed during the period between the shift from the arc state to the short-circuit state and the detection of a constriction phenomenon. Thus, the amount of the welding current at the time of detecting the constriction phenomenon is smaller than in the case without any first decrease. Accordingly, the welding current Ia decreases at the time of opening the short-circuit, which reduces the occurrence of spatter.

The first slope S1 is larger than the second slope S2. This reduces the time from the start of the short-circuit state to the shift to the arc state, and an increase in the welding current Ia at the time of opening the short-circuit that may be caused by a too large second slope S2. In addition, with an increase in the amount of heat given to the welding wire 3 from the start of the short-circuit state until reaching the first peak value P1, the welding current Ia decreases at the second peak value P2, that is, at the time of opening the short-circuit.

The first slope S1 with 350 A/ms or more reduces the time from the start of the short-circuit state to the shift to the arc state more than a first slope less than 350 A/ms. This also reduces the failure in shifting from the short-circuit state to the arc state.

The second peak value P2 is smaller than the first peak value P1. This reduces a time required from the start of the short-circuit state to the shift to the arc state, and the amount of the welding current Ia at the time of opening the short circuit, reducing the occurrence of spatter.

The second bottom value B2 is smaller than the first bottom value B1. This reduces a time required from the start of the short-circuit state to the shift to the arc state, and the amount of the welding current Ia at the time of opening the short circuit, reducing the occurrence of spatter.

Second Embodiment

Figure 4:
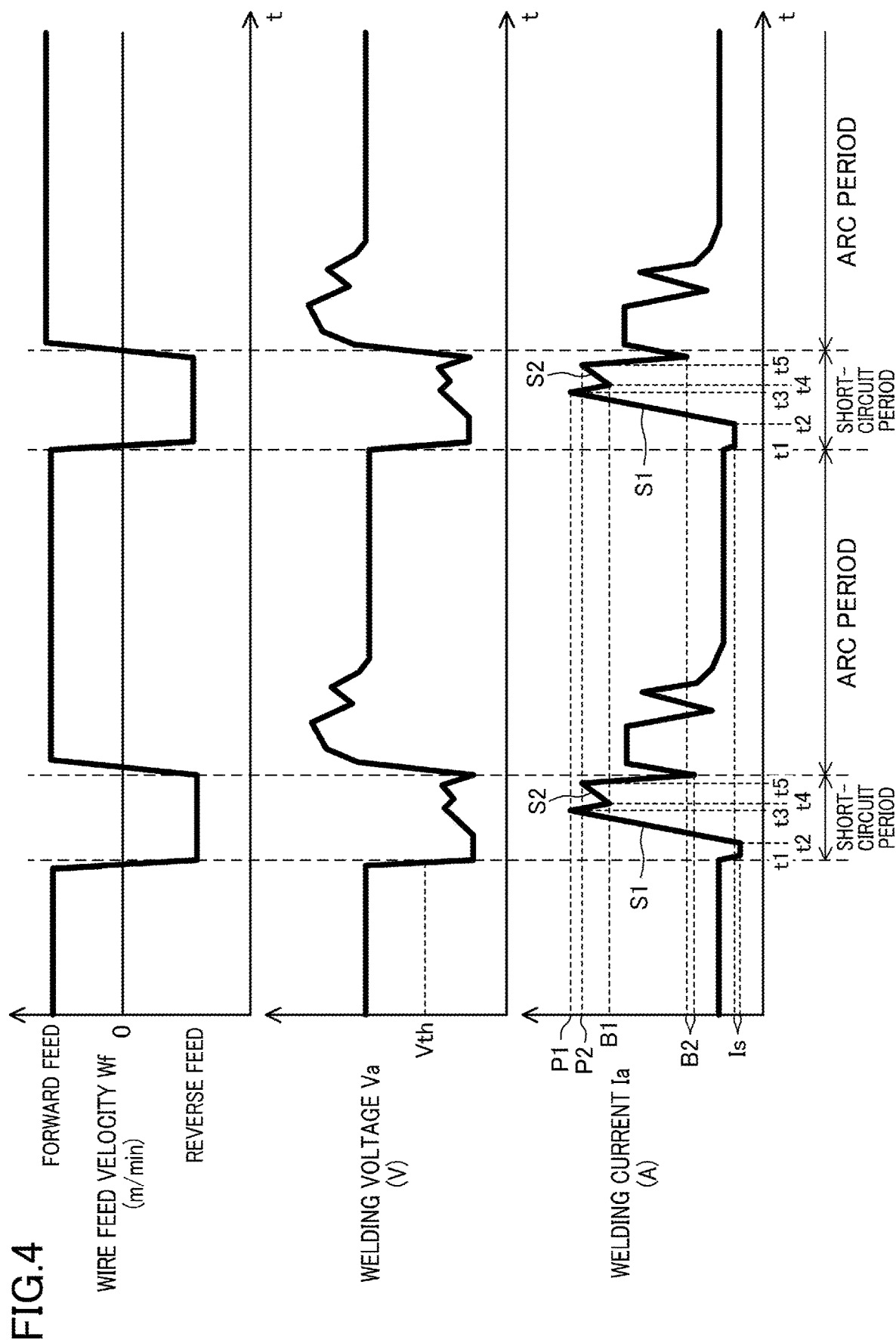
FIG. 4 corresponds to FIG. 2 and shows a second embodiment.

FIG. 4 corresponds to FIG. 2 and shows a second embodiment of the present disclosure.

In the second embodiment, short-circuit arc welding is performed with the torch 2 held by a robot (not shown). In addition to the function (i.e., the forward feeding function) of feeding the welding wire 3 toward the base metal 5 at a feed velocity based on the outputs from the wire feed velocity control unit 31, the wire feeding unit 27 has a function (i.e., a reverse feeding function) of drawing the welding wire 3 away from the base metal 5 at a drawing velocity based on the outputs from the wire feed velocity control unit 31.

The wire feed velocity control unit 31 outputs signals indicating the positive (forward) and negative (reverse) wire feed velocities Wf. The wire feed velocity control unit 31 sets the wire feed velocity Wf to a predetermined positive value if the state signal St indicates the arc state, and to the predetermined negative value if the state signal St indicates the short circuit state.

In the second embodiment, as shown in FIG. 4, at the time t1, once the state determination unit 29b outputs the state signal St indicating the short-circuit state, the wire feed velocity Wf changes from positive to negative, and the wire feeding unit 27 starts drawing the welding wire 3 away from the base metal 5 at a constant velocity. During the short-circuit period, the wire feeding unit 27 continues drawing the welding wire 3 at the constant velocity.

The first peak value P1 is set in advance within a range from 100 A to 200 A. In this manner, in the second embodiment, the first peak value P1 is set to be smaller than that in the first embodiment. At the time t3, the constriction occurs and the molten metal droplet D slightly constricts, although the molten metal droplet D at the tip of the welding wire 3 constricts at a smaller degree than at the time t3 (see FIG. 2) in the first embodiment.

At the time t4, in response to (after) the lapse of a preset time from a predetermined reference time, the welding current control unit 29c turns on the second switching element 17 and controls the first switching element 11 to increase the welding current Ia with the second slope S2 from the first bottom value B1. Here, the predetermined reference time may be a start time of the short-circuit arc welding or any of the times t1 to t3. The first bottom value B1 ranges from 50 A to 150 A.

At the time t5, in response to (after) the lapse of a preset time from a predetermined reference time, the welding current control unit 29c turns off the second switching element 17. Here, the predetermined reference time may be a start time of the short-circuit arc welding or any of the times t1 to t4. Alternatively, the second switching element 17 may be periodically turned off. At the time t5 in FIG. 4, the constriction occurs in the molten metal droplet D at the tip of the welding wire 3, but at a smaller degree than at the time t5 (see FIG. 2) in the first embodiment. The value of the welding current Ia at the time of shifting to the arc state, that is, the second bottom value B2 is smaller than the second bottom value B2 in the first embodiment. In this manner, even if less heat enters the welding wire 3 at the welding current Ia and a welding voltage Va in the reverse feeding operation of the welding wire 3, the constriction occurs in the molten metal droplet D at the tip of the welding wire 3. This reduces the welding current at the time of opening the short circuit more than the case of constantly feeding the welding wire 3. Accordingly, the occurrence of spatter is reduced effectively.

The other configurations and operations are the same as those in the first embodiment, and detailed description thereof will thus be omitted.

In the second embodiment, in the short-circuit state, since the welding wire 3 is drawn (reversely runs) away from the base metal 5, the short circuit of the welding wire 3 is easily open, and less welding current Ia is required to open the short circuit. Accordingly, the short-circuit period and the occurrence of spatter are reduced more effectively. In the arc state, the welding wire 3 is fed toward the base metal 5 (i.e., forward), the accuracy of the bead width and of the depth of weld penetration can be ensured.

In the first embodiment described above, at the time t5, the welding current control unit 29c performs the control of reducing the welding current Ia in response to detection of the constriction phenomenon of the molten metal droplet D. Alternatively, the control may be performed in response to (after) the elapse of a preset time from a predetermined reference time. The predetermined reference time may be a start time of the short-circuit arc welding or any of the times t1 to t4.

In the second embodiment described above, at the time t5, the welding current control unit 29c performs the control of reducing the welding current Ia in response to (after) the elapse of a preset time from a predetermined reference time. Alternatively, the control may be performed in response to detection of the constriction phenomenon of the molten metal droplet D, like in the first embodiment.

In the second embodiment, the direction (i.e., positive or negative) of the wire feed velocity Wf changes in accordance with the state signal St. Alternatively, the short-circuit period and the arc period may be specified in advance by an experiment or other type of study, and the direction (i.e., positive or negative) of the wire feed velocity Wf may periodically change based on the specified short-circuit and arc periods.

In the first and second embodiments, the present invention is applied to carbon dioxide gas arc welding. In addition, the present invention is also applicable to metal active gas welding using, as a shield gas, a mixture of an inert gas and carbon dioxide gas.

In the first and second embodiments, the base metal 5 is mild steel. Alternatively, the base metal 5 may be other materials such as stainless steel, aluminum, and copper.

In the first embodiment, the welding is performed with the torch 2 held by the operator. Alternatively, the welding may be performed at a welding speed ranging from 0.3 m/min to 1.5 m/min with the torch 2 held by a robot.

The arc welding control method and arc welding device according to the present disclosure more reliably and effectively reduces the occurrence of spatter, and are useful as an arc welding control method and an arc welding device that control welding currents in arc welding.

What is claimed is:

1. An arc welding control method of controlling a welding current in short-circuit arc welding of feeding a welding wire toward a base metal and alternating a short-circuit state and an arc state, the arc welding control method comprising:

executing, in the short-circuit state, a first increase in the welding current with a first slope, a first decrease in the welding current to a first bottom value after executing the first increase, a second increase in the welding current with a second slope after executing the first decrease, a second decrease in the welding current to a second bottom value that is smaller than the first bottom value after executing the second increase, and an opening of the short-circuit by an increase in the welding current after executing the second decrease, wherein the opening of the short-circuit shifts a state from the short-circuit state to the arc state.

2. The arc welding control method of claim 1, wherein the second decrease reduces the welding current in response to detection of a constriction phenomenon of a molten metal droplet.

3. The arc welding control method of claim 1, wherein the welding wire is fed toward the base metal in the arc state, and drawn away from the base metal in the short-circuit state.

4. The arc welding control method of claim 1, wherein the first slope is larger than the second slope.

5. The arc welding control method of claim 4, wherein the first slope is 350 A/ms or more.

6. The arc welding control method of claim 1, wherein the first increase increases the welding current to a first peak value, and
the second increase increases the welding current to a second peak value that is smaller than the first peak value.

7. The arc welding control method of claim 1, wherein the short-circuit arc welding uses carbon dioxide gas as shielding gas,
the base metal is a plate member made of mild steel, and
the base metal has a plate thickness set within a range from 2.3 mm to 4.5 mm.

8. An arc welding device for short-circuit arc welding of feeding a welding wire toward a base metal and alternating a short-circuit state and an arc state, the arc welding device comprising:

a welding current control unit configured to execute, in the short-circuit state, a first increase in the welding current with a first slope, a first decrease in the welding current to a first bottom value after executing the first increase, a second increase in the welding current with a second slope after executing the first decrease, a second decrease in the welding current to a second bottom value that is smaller than the first bottom value after executing the second increase, and an opening of the short-circuit by an increase in the welding current after executing the second decrease, wherein the opening of the short-circuit shifts a state from the short-circuit state to the arc state.

* * * * *